United States Patent

[11] 3,558,866

[72] Inventor Barrie Kenneth Poulson
 High Wycombe, England
[21] Appl. No. 704,686
[22] Filed Feb. 12, 1968
[45] Patented Jan. 26, 1971
[73] Assignee Instron Limited
 High Wycombe, England
 a corporation of Great Britain
[32] Priority Feb. 15, 1967
[33] Great Britain
[31] 7357/67

[54] PROOF STRESS INDICATOR
 8 Claims, 3 Drawing Figs.
[52] U.S. Cl. .................................................. 235/151.3,
 73/89; 235/184
[51] Int. Cl. ..................................................... G01b 5/30,
 G06g 7/00

[50] Field of Search............................................ 235/151.3,
 184, 179; 73/89

[56] References Cited
 UNITED STATES PATENTS
 3,076,603 /1963 Gruber......................... 235/184X Primary Examiner—Malcolm A. Morrison
Assistant Examiner—Edward J. Wise
Attorney—William W. Rymer ABSTRACT: A proof stress indicator for use with a stress/strain testing apparatus in which there is produced during the testing of a specimen two electrical signals which are respective analogues of the increases in the stress and strain of the specimen above the particular values thereof obtained at a selected earlier stage of the testing and being operable for providing a response when the strain electrical signal has increased above the stress electrical signal by an amount which is an analogue of a preselected proof stress percentage.

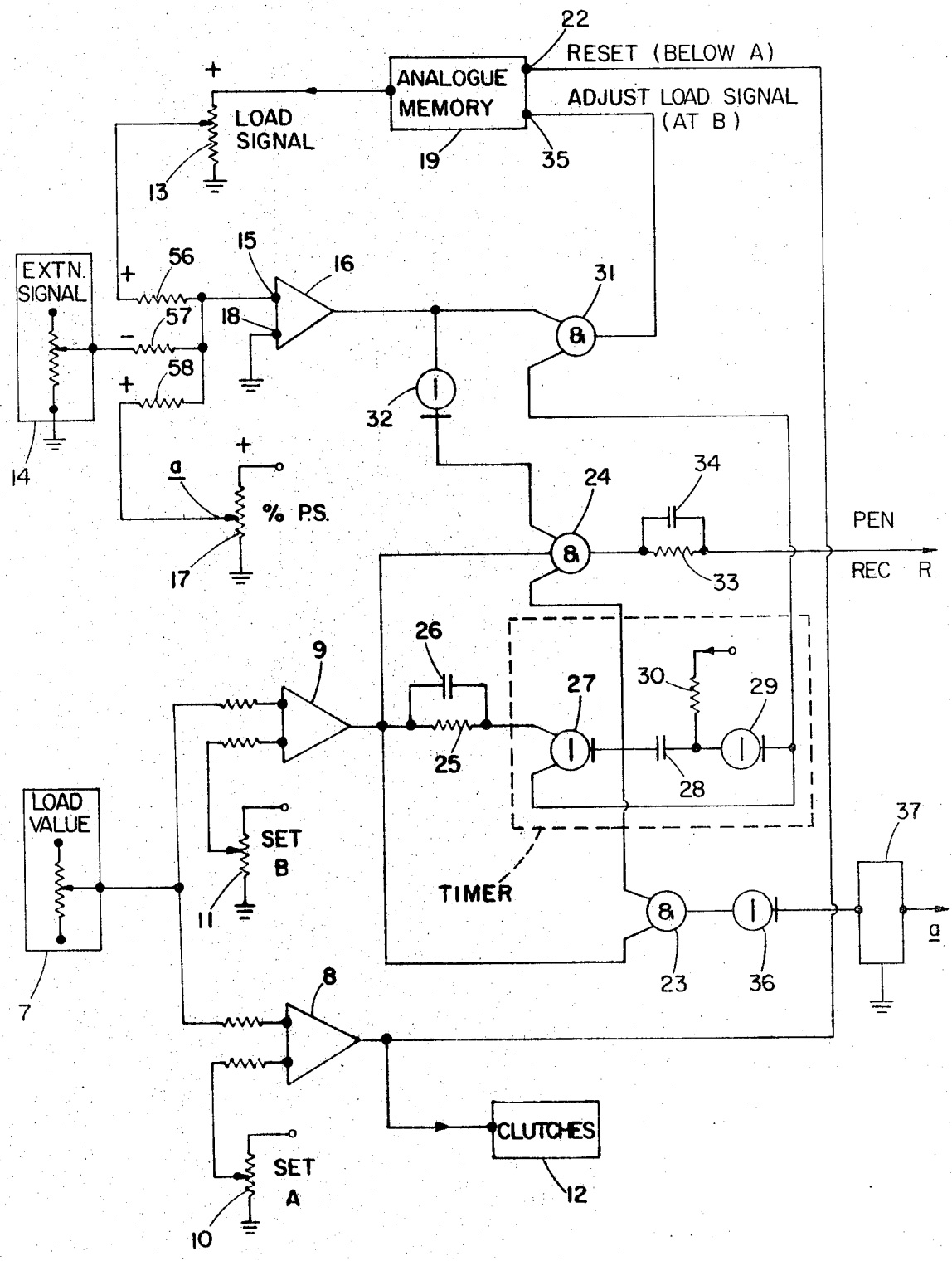

PROOF STRESS INDICATOR

This invention relates to analogue memory devices and their use in proof stress indicators for stress/strain testing machines.

In the tensile testing of some materials, variations of the properties of the specimen are such that it is possible to recognize reasonably clearly an "elastic limit" or a "yield point." With many materials, however, these points are at best ill-defined. In order to make it possible to specify some definite quantitative measure of the yieldability of a specimen under test, it has become customary to speak in terms of a "proof stress."

FIG. 1 of the accompanying drawings shows a curve 2 produced during a tensile test, for example by the pen recorder of a tensile-testing machine. The vertical drive (load) to such a pen recorder can be supplied by a servomotor operating in dependence upon the electrical output of a load cell, of known type, operating on the basis of strain gauges which are in mechanical connection with the specimen. The horizontal drive (extension) to the pen recorder may be provided by a servomotor operating in dependence upon the electrical output from an optical extensometer providing a measure of the extension of a gauge length of the specimen in known manner.

The curve 2, i.e. the stress/strain characteristic of the specimen under test, is somewhat idealized in that its initial part is rectilinear, in accordance with a direct proportionality between extension (strain) and load (stress). For higher load, however, the material deviates from this perfectly elastic behavior, and the rate of extension with a given, rate of increase of load increases as shown by the upper part of the curve 2. A proof stress value may be obtained graphically as follows. An extension value PS is first marked-off as representing that degree of deviation from perfectly elastic behavior in which the operator is interested. This degree of deviation is generally specified in terms of percentage extension of the gauge length of the material under test. A line (shown as a broken line 3 in FIG. 1) is then drawn from the point PS, parallel with the initial linear part of the curve 2, to meet the curve 2 in a point 4. The load, or rather the stress, at the point 4 is the required proof stress value. If the extension value at PS amounts to 5 percent of the gauge length of the specimen, the stress value at 4 is known as the 5 percent proof stress of the specimen.

Some specimens exhibit no substantially linear initial portion of their stress/strain characteristics. In the case of such a material it is usual to choose two arbitrary load values, A and B, the points corresponding to which, on the stress/strain characteristic, are to be taken as defining the initial slope of the curve for the purposes of determining a proof stress. Thus, with reference to FIG. 1, the line 3 is drawn parallel to a straight line joining points 5 and 6 which are empirically determined as corresponding respectively to the chosen load values A and B, this being done irrespective of whether the characteristic is actually rectilinear between the points 5 and 6.

To obtain proof stress values by actually drawing lines on the chart produced by such a pen recorder is of course tedious and time-consuming. It is clearly preferable that a proof stress value should be obtainable directly as a result of the test on the specimen, and we have hitherto been aware of an electrical proof stress indicator for performing this function as follows. The apparatus is intended to operate on the basis of two electrical signals which are derived from the testing machine and which are respective analogues of the increases in the stress and strain of the specimen above the zero values thereof obtaining at an initial stage (corresponding to the point 5 of FIG. 1) of the testing. The said two electrical signals are applied, in opposition to one another, to an electronic comparison circuit. At a selected intermediate stage (corresponding to the point 6 of FIG. 1) the testing is halted, i.e. no further increase of stress or strain is imposed on the specimen for the time being, and an adjustment is made manually to the circuitry supplying one of the said two signals with a view to equalizing them. Achievement of equalization is indicated by the reduction to zero of the reading given by a meter connected to the output of the comparison circuit. The result of such equalization is that in the subsequently continued testing the two signals will remain equal to one another in magnitude if the further strain produced by the subsequent increased stressing of the specimen is in accordance with a completely rectilinear stress/strain characteristic passing through those two points (5 and 6) of the stress/strain characteristic which represent respectively the said initial stage and the said selected intermediate stage of the testing. Before continuing the test after such equalization, however, a third electrical signal, being an analogue of a selected proof stress percentage, is connected to the comparison means as an addition to the stress electrical signal. The presence of this proof stress analogue input is indicated on the aforesaid meter, which gives a reading on a scale which may be calibrated in terms of proof stress percentage. In the subsequently resumed testing the meter reading will remain constant so long as the relation between stress and strain remains perfectly linear. However, if and when the strain electrical signal begins to increase faster than the stress electrical signal, corresponding to the curved upper part of the characteristic 2 in FIG. 1, the meter reading will begin to fall, and dropping of the meter reading to zero then indicates attainment of the selected proof stress. The actual load value at that instant can then be read from a meter fed with the aforesaid stress electrical signal.

Such an instrument suffers from the disadvantage that judgement of the attainment of a zero reading of the proof stress meter, both when equalizing and when judging attainment of the proof stress, is subject to human error. Furthermore, the apparatus requires that the testing must be halted at an intermediate stage, in order to allow equalization be effected and the proof stress analogue signal to be set-in. With some specimen materials, such intermediate halting of the testing would be unacceptable, or at least undesirable, owing to consequent modification of the stress/strain characteristic by relaxation effects occurring in the material while equalization and proof stress setting-in is being effected.

Clearly it is desirable that some automatically operating means should be provided for indicating the point at which a desired proof stress is attained during the testing of a specimen by a stress/strain testing machine. Further, since lack of continuity in the variation of the applied load during such a stress/strain test can give rise to variations in the results indicated by the overall test, it is desirable that such automatic means should not require any halting or slowing down of the rate of testing until the proof stress is attained.

For use in an equalizing system for such an automatic proof stress indicator we eventually concluded that we required a device which could supply an output voltage across a load signal potentiometer, which output should not drop substantially during the time from attainment of equalization to attainment of the proof stress valve in the subsequent progress of the test. The tap of this load signal potentiometer was to be driven in dependence on the output from the load cell of our testing machine, so as to provide the aforesaid stress electrical signal. This stress electrical signal was to be fed, in opposition to an extension electrical signal, to an electronic comparator circuit of known type. The output of the aforesaid device, across the load signal potentiometer, was required to be reset to a fixed value before such equalization was commenced, and we intended to design means adapted to operate at the preselected one stage (B) to bring about the required equalization by causing a steady change in the output of the aforesaid device to occur thereby to alter the magnitude of the stress electrical signal being fed to the comparator circuit. The action of a comparator circuit should be to supply a response, when equalization of the aforesaid two electrical signals was achieved, such as to stop further adjustment of the output from the aforesaid device. Throughout the remainder of the test the output of the aforesaid device should be held constant across the load signal potentiometer. Thus the device may be described as an analogue memory device.

Now, the only practical form of analogue memory device hitherto known to us as possibly suitable for our present purposes was a mechanical device comprising essentially a potentiometer, having a fixed reference voltage connected across it, and having its slider drivable by means of an electric motor to adjust the output which is provided from that slider. On consideration, however, it was found that the adjustment, by way of the motor drive, of such a mechanical analogue memory device would be too slow to be acceptable for our present purposes. Accordingly, attention was given to the possibility of using a capacitor to store the necessary voltage in the analogue memory device, and providing it with rapid charging and discharging circuitry. At first it was thought doubtful whether such a circuit could be designed which would enable the capacitor to retain its charge, thereby maintaining constant output, for sufficiently long periods for the proof stress value to be attained. Furthermore, it was thought that the "readout" of the voltage stored, i.e. its connection to the load signal potentiometer, would provide discharging means for the capacitor such as to give it an acceptably high rate of undesired leakage discharge. However, we have found that such an electronic analogue memory device can be designed, surprisingly, to retain the required output substantially constant for the length of time involved in carrying out a complete specimen test. We believe such a device to be novel in itself. Thus, according to one aspect of the present invention there is provided an analogue memory device, having a supply line for connection to a DC supply voltage, and having first and second control inputs, and including a capacitor for storing an analogue voltage, and controllable charging means connected between the capacitor and the supply line for charging the capacitor from the supply line to increase the stored analogue voltage, the charging means having first switching means connected with the first control input for making such charging occur when a particular control signal is applied to the first control input and preventing discharge of the capacitor through the charging means when such particular control signal is absent from the first control input, and the device further including controllable discharging means connected across the capacitor for discharging it to decrease the stored analogue voltage, the discharging means comprising second switching means connected to the second control input for making such discharging take place when a particular control signal is applied to the second control input and preventing discharge of the capacitor through the discharging means when such particular control signal is absent from the second control input, and the device further including a readout circuit having an input connected to the capacitor to receive the stored analogue voltage as an input signal and having an output for affording a readout of such stored analogue voltage, the readout circuit having high input impedance also that such readout can be effected without altering substantially the magnitude of the analogue voltage stored by the capacitor.

According to a second aspect of the invention there is provided a voltage-matching device, for operating in dependence upon an input voltage to supply an output voltage equal in magnitude to the input voltage, comprising an analogue memory device according to the last preceding paragraph, a comparator circuit connected to have supplied thereto, for comparison with one another, the said input voltage and a voltage taken as a percentage of the output of the analogue memory device, and command means for applying such particular control signal to the second control input, the comparator circuit having an output connected with the command means to stop the application of such particular control signal to the second control input, thereby to stop the discharge of the capacitor, when the voltage taken from the output of the analogue memory device has fallen to a value substantially equal to the said input voltage, and there being reset means connected with the said first control input for applying such particular control signal thereto, before such comparison is commenced, to ensure that the voltage taken from the output of the analogue memory device is higher than the said input voltage at the commencement of the comparison; whereby the said voltage taken from the output of the analogue memory device is reduced automatically, in consequence of such comparison, to the desired value equal in magnitude to the said input voltage.

According to a third aspect of the invention there is provided a voltage-matching device, for operating in dependence upon an input voltage to supply an output voltage equal in magnitude to the input voltage, comprising an analogue memory device according to the last but one preceding paragraph, a comparator circuit connected to have supplied thereto, for comparison with one another the said input voltage and a voltage taken as a percentage of the output of the analogue memory device, and command means for applying such particular control signal to the first control input, the comparator circuit having an output connected with the command means to stop the application of such particular control signal to the first control input, thereby to stop the charging of the capacitor, when the voltage taken from the output of the analogue memory device has risen to a value substantially equal to the said input voltage, and there being reset means connected with the said second control input for applying such particular control signal thereto, before such comparison is commenced, to ensure that the voltage taken from the output of the analogue memory device is lower than the said input voltage at the commencement of the comparison; whereby the said voltage taken from the output of the analogue memory device is increased automatically in consequence of such comparison to the desired value equal in magnitude to the said input voltage.

A voltage-matching device according to either of the last two preceding paragraphs may include a potentiometer connected across the output of the analogue memory device, the voltage taken from that output being taken at a slider of the potentiometer.

According to a fourth aspect of the invention there is provided, for use with a stress/strain testing apparatus in which there is produced during the testing of a specimen two electrical signals which are respective analogues of the increases in the stress and strain of the specimen above the particular values thereof obtaining at a selected earlier stage of the testing, a proof stress indicator including electronic comparison means connected to have the said two electrical signals supplied thereto in opposition to one another, equalizing means operable to adjust the magnitudes of the said two electrical signals to make them cancel each other's effect at the said comparison means at one selected stage of the testing, thereby to effect equalization of the two signals so that thereafter they remain equal to one another in magnitude if the further strain produced by subsequent increased stressing of the specimen is in accordance with a completely rectilinear stress/strain characteristic passing through the two points which represent respectively the said selected earlier stage and the said one selected stage of the testing, and proof stress insertion means for causing a third electrical signal, which is an analogue of a preselected proof stress percentage, to be fed to the comparison means after such equalization to influence its subsequent output in such manner that it provides a response if and when the strain electrical signal has increased above the stress electrical signal by an amount equal to the said third electrical signal, thereby indicating attainment of the selected proof stress, wherein the said equalizing means are provided by a voltage matching device according to the last preceding paragraph and arranged for effecting the equalization without halting the testing of the specimen, one of the said two electrical signals being the input voltage of the voltage matching device and the other being the slider voltage from the potentiometer, there being means arranged for driving the slider to move in accordance with such increases in the quantity represented by the slider voltage, and the said electronic comparison means being the comparator of the voltage matching device, and wherein the proof stress insertion means comprise an electronic timer connected to become operative automatically, at the commencement of the said equalization of the two signals, to allow time for the equalization to be effected and then to cause the said third electrical signal to be fed to the comparison means.

Further reference will now be made, by way of example, to the accompanying drawings, in which:

FIG. 2 is a circuit diagram of a proof stress indicator embodying the invention.

Figure 1:
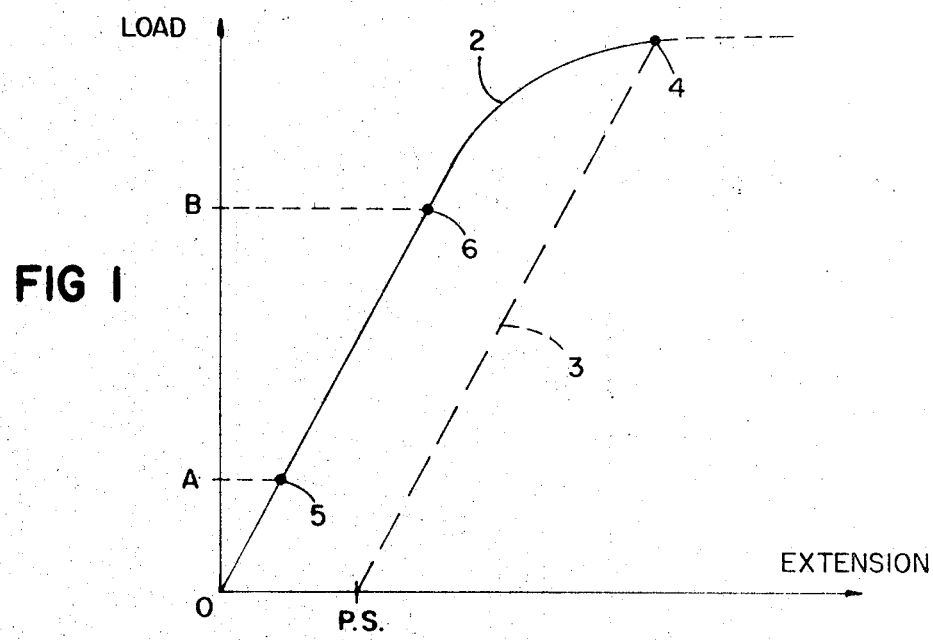
FIG. 1 is a graph, as already described.

The proof stress indicator of FIG. 2 is designed to produce automatically, on the stress/strain curve produced by the pen recorder of a testing machine as described hereinbefore, an indication of the point at which the desired proof stress is achieved. The chosen load values A and B (FIG. 1), and the desired proof stress percentage are preset into the indicator, as selected by the operator, before a test is commenced, and the indication of the proof stress point is provided without any intermediate halting of the test.

FIG. 2 shows a load value potentiometer 7 the slider of which provides continuously, throughout the test (i.e. the steady increasing of stress and/or strain in the specimen), an output voltage proportional to the applied load. For this purpose a steady reference voltage is applied across the potentiometer resistance ends and the slider is driven along the resistance by a servomotor controlled from the output of a load cell which measures the stress in the specimen by means of strain gauges, in well-known manner. The output from this load value potentiometer 7 is supplied to respective inputs of two comparator circuits (which may alternatively be described as nulling amplifiers) 8 and 9, which compare those inputs respectively with preselected voltages tapped from potentiometers 10 and 11. Fixed voltage supplies are connected across the potentiometers 10 and 11, and the voltages tapped from these potentiometers serve as analogue voltages for the selected load values A and B. The potentiometer controls are calibrated so that an operator can preset the value A at the potentiometer 10 and the value B at the potentiometer 11.

Using the terminology of logic circuitry, the output from the amplifier 8 represents 0 when the input from the load value potentiometer 7 is lower than that from the potentiometer 10, but changes to represent 1 when the input from potentiometer 7 rises through that from potentiometer 10. Similarly, the output from the amplifier 9 changes from 0 to 1 as the input from the load value potentiometer 7 rises through that from the potentiometer 11.

The output from the amplifier 8 controls clutches 12 which are disengaged when the output from amplifier 8 represents 0 but are engaged when the output from amplifier 8 represents 1. The clutches 12 are interposed between a drive mechanism of the testing machine and the sliders of a load signal potentiometer 13 and an extension signal potentiometer 14. Thus, from the moment of engagement of the clutches 12 the sliders of the signal potentiometers 13 and 14 move along their resistances in dependence upon the subsequent increases in load, and extension of the specimen under test. In this way the sliders of the potentiometers 13 and 14, provided with reference voltages across their resistances, and adapted to provide respective analogue voltages for such subsequent increases.

The output from the load signal potentiometer 13 is applied, by way of a resistor 56, as a positive voltage to one input 15 of a comparator circuit (nulling amplifier) 16, and the output from the extension signal potentiometer 14 is applied, by way of a resistor 57, as a negative voltage to the input 15. An analogue position for a chosen proof stress percentage may be preset by an operator on a potentiometer 17, the slider of which is also connected, by way of a resistor 58, to the input 15 of the comparator 16, but initially a switching device 37 ensures that the voltage output from 17 is zero. A second input 18 of the comparator 16 is connected to a zero reference-voltage earth line. The comparator 16 compares the sum of the voltages applied to its input 15 with the zero voltage applied to its input 18 producing an output representing 0 when the sum of the voltages applied to input 15 is negative and an output representing 1 when the summed input at 15 is positive with respect to earth.

The nulling amplifiers 8, 9 and 16 may be of known type, and preferably comprise respective integrated-circuit semiconductor elements (for example, "MOTOROLA" MC1431 M01431 components).

Figure 3:
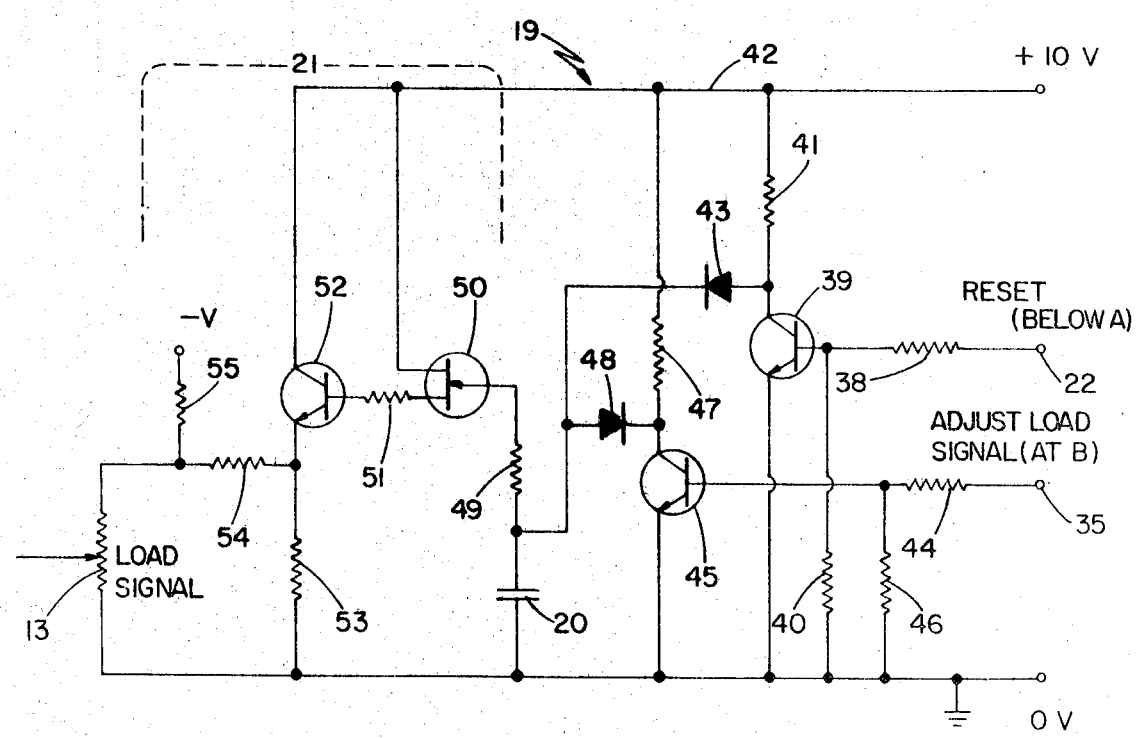
FIG. 3 is a circuit diagram of a detail of FIG. 2.

The indicator employs an analogue memory device 19 which, as shown more particularly in FIG. 3, comprises basically a 10/uF capacitor 20, for storing an analogue voltage, connected across the input to a readout circuit consisting of an amplifier 21 (FIG. 3) which has a high input impedance and an amplification factor of substantially unity. By high input impedance we mean an input impedance of at least $10^3$ Megohms, preferably $250.10^3$ Megohms or higher. The amplifier 21 permits the value of the stored analogue voltage to be read out without being lost, i.e. without any substantial discharge of the capacitor 20. The output from the amplifier 21, being substantially equal to the voltage stored by the capacitor 20, is connected across the load signal potentiometer 13. Thus the load signal taken from the slider of the potentiometer 13 is a percentage of the output of the analogue memory device 19, which percentage increases from zero as the test proceeds from the point 5 of FIG. 1. Further details of the analogue memory device 19 are given hereinafter.

With reference to FIG. 2 again, the output from the amplifier 8 is also connected to one input 22 of the analogue memory device 19. When a signal representing 0 is applied to the input 22, the analogue memory circuit is reset (as described hereinafter) by recharging of the capacitor 20 (FIG. 3) up to a DC supply voltage of substantially +10 v. When the signal to the input 22 represents 1 it inhibits any such recharging.

The output from the amplifier 9 is connected to the lower and middle inputs respectively of a two-input AND gate 23 and a three-input AND gate 24, and is connected also through a differentiating circuit, including a resistor 25 and a capacitor 26, to the upper input of a two-input NOR gate 27. The output of the NOR gate 27 is connected to the respective upper and lowermost inputs of the AND gates 23 and 24, and is connected also, through a capacitor 28, to the input of a NEGATER 29. A fixed voltage representing 1 is also connected, through a resistor 30, to the input of the NEGATER 29. The output from the NEGATER 29 is connected to the lower input of the NOR gate 27, and is also connected to the lower input of a two-input AND gate 31.

The output from the comparator 16 is connected to the upper input of the AND gate 31, and is connected also to the input of a NEGATER 32 the output of which is connected to the uppermost input of the AND gate 24. The output from the AND gate 24 is connected through a differentiating circuit, including a resistor 33 and a capacitor 34, to the pen recorder of the testing machine.

The output from the AND gate 31 is connected to a second input 35 of the analogue memory device 19. When a signal representing 1 is applied by the AND gate 31 to the input 35, the capacitor 20 (see FIG. 3) is allowed to discharge (as described hereinafter) so that the voltage stored on the capacitor 20 decreases; the voltage applied across the load signal potentiometer 13 decreases with the voltage stored by the capacitor 20. This discharge is stopped automatically when the signal fed to the input 35 changes to 0.

The output from the AND gate 23 is connected to the input of a NEGATER 36 the output of which is connected to control the switching device 37 for gating the output from the proof stress percentage potentiometer 17. A positive reference voltage is connected across the proof stress potentiometer 17. The action of the switching device 37 is such that when the output from the NEGATER 36 represents 1, the slider a of the potentiometer 17 is shorted to earth so that no proof stress voltage is applied to the input 15 of comparator 16. This shorting connection is broken when the output from NEGATER 36 represents 0, the preset proof stress percentage voltage being then applied to the aforesaid input 15, effectively as an addition to the input from the load signal potentiometer 13. The switching device 37 may comprise an NPN-transistor having its emitter connected to earth and its collector connected to the slider $a$ of the proof stress potentiometer 17, the base of the transistor being connected to the output of the NEGATER 36. If an appropriate negative bias voltage is applied to the base of such transistor, the emitter-collector path of the transistor will be nonconductive except when the output from the NEGATER 36 represents 1.

The switching of the clutches 12 by the output of the amplifier 8 can be effected by means of a thyristor connected in series with electrical clutch-coils and arranged to be switched into its conductive state by a 1 signal from the amplifier B.

If desired, the AND gate 24 can be connected so that an output representing 1 therefrom switches on a thyristor (not shown) so as to apply brakes to the loading and extension mechanisms and thus stop a test at the proof stress point.

The circuitry of the analogue memory device 19 is shown in FIG. 3. The input 22 is connected through a 4.7 kilohm resistor 38 to the base of an NPN-transistor 39, which base is connected also to earth through a 4.7 kilohm resistor 40. The emitter of the transistor 39 is connected to earth, and its collector is connected to one end of a 2.2 kilohm resistor 41 the other end of which is connected to a +10 v. DC supply line 42.

The collector of transistor 39 is connected also to the anode of a semiconductor diode 43, the cathode of which is connected to one side of the aforementioned capacitor 20. The other side of the capacitor 20 is connected to earth.

The input 35 is connected through a 4.7 kilohm resistor 44 to the base of an NPN-transistor 45, which base is connected also to earth through a 4.7 k$\Omega$ resistor 46. The emitter of the transistor 45 is earthed, and its collector is connected through a 690 ohm resistor 47 to the supply line 42. The collector of transistor 45 is connected also to the cathode of a semiconductor diode 48, the anode of which is connected to the said one side of the capacitor 20 and therefore to the cathode of the diode 43.

The diodes 43 and 48 have high reverse impedance, by which we mean a reverse impedance of substantially $10^3$ megohms or higher. The actual diodes which we use in the circuit of FIG. 3 are silicon diodes, each having a reverse impedance of about $10^5$ megohms. The high reverse impedance is intended to render negligible, for present purposes, any discharge of the capacitor 20 through the diodes 43 and 48 in their reverse directions.

The voltage of the capacitor 20 is applied across the input of the unity-gain readout amplifier 21, which has an input impedance of about $250.10^3$ megohms, provided by an N-channel field-effect transistor 50. Thus, the said one side of the capacitor 20 is connected through a 10 kilohm resistor 49 to the gate of the FET 50. The drain of the FET is connected to the supply line 42 and the source of the FET is connected through a 100 ohm resistor 51 to the base of an NPN-transistor 52. The collector of transistor 52 is connected to the supply line 42, and its emitter is connected through a 10 kilohm resistor 53 to earth. The output from the amplifier 21 is taken from the emitter of transistor 52 and applied, through a resistor 54, across the load signal potentiometer 13. Between the load signal potentiometer 13 and the resistor 54 is connected one end of a resistor 55 the other end of which is connected to a negative reference potential −V, for backing-off a spurious zero-error voltage which appears across resistor 53, as a result of transistor leakage currents and the like, even when the voltage across capacitor 20 is zero.

The DC supply and reference voltages for the circuits may be provided in conventional manner, and it will be appreciated that some minor details of the circuitry have been omitted, particularly from FIG. 2, for the sake of simplicity.

Operation of the proof stress indicator, during a tensile test carried out by means of a machine such as is mentioned hereinbefore, is as follows (see FIG. 2).

The desired A, B, and percentage proof stress values are set initially by means of the previously calibrated potentiometers 10, 11, and 17, respectively.

Initially, the output from the load value potentiometer 7 is less than that from either of the potentiometers 10 and 11, so the outputs from the amplifiers 8 and 9 both represent 0. The 0 output from amplifier 8 ensures that the clutches 12 are disengaged, so that the load and extension signal potentiometers 13 and 14 will initially give zero outputs and also ensures resetting (as described in more detail hereinafter) of the analogue memory device 19 so that the full 10 v. supply potential is applied across the load signal potentiometer 13.

The 0 signal from the amplifier 9 ensures that the AND gate 23 supplies a 0 signal to the NEGATER 36, which therefore supplies a 1 signal to the switching device 37, which in turn ensures that no output is fed from the proof stress potentiometer 17 to the input 15 of the amplifier 16. The 0 output from the amplifier 9 is further applied through the resistor 25 to the upper input of the NOR gate 27, and is also applied to the middle input of the AND gate 24, thereby ensuring that its output to the pen recorder is zero.

The 1 signal applied through the resistor 30 to the NEGATER 29 ensures a 0 output from that NEGATER, which output is applied to the lower input of the AND gate 31 and ensures a 0 signal at the input 35 of the memory device 19, which causes no interference with the resetting of the memory device. The 0 output from the NEGATER 29 is also applied to the lower input of the NOR gate 27. Since both its inputs receive 0 signals, the output from the NOR gate 27 represents 1, which is applied to the lowermost and upper inputs respectively of the two AND gates 24 and 23. However, the AND gates 24 and 23 are closed by virtue of the 0 signals applied as above described.

As the load is increased steadily, during the test, a point is eventually reached at which the output from the load value potentiometer 7 increases through the output from the preset potentiometer 10. This is the point 5 of FIG. 1, corresponding to the preselected load A. At this point the output from amplifier 8 changes to 1, which causes the clutches 12 to be engaged, so that the load and extension signal potentiometers 13 and 14 thereafter produce respective signals which are analogue voltages of the subsequent increases of the load and extension of the specimen. The application of the 1 signal to the input 22 of the analogue memory device prevents resetting of the memory device thereafter until the test has been completed.

The reference voltage across the extension signal potentiometer 14 is relatively low, for example −5.5 v., to ensure that at this early stage of the testing the output from the load signal potentiometer 13 is always greater (within the operating range of the indicator) than that from the extension signal potentiometer 14. This ensures a net positive voltage input at 15, so that the output of the comparator 16 represents 1. This 1 signal is applied to the upper input of the AND gate 31 and is applied also to the NEGATER 32, which therefore supplies a 0 signal to the uppermost input of the AND gate 24.

The test proceeds steadily, the three potentiometers 13, 14 and 17 producing appropriately increasing outputs and the pen recorder producing the characteristic curve (such as the curve 2 in FIG. 1) of the specimen under test, until a point is reached at which the load increases through the value B. This is the point 6 of FIG. 1. At this point the output from the load value potentiometer 7 increases through that from the potentiometer 11, with the result that the output from amplifier 9 changes from 0 to 1. Accordingly, a 1-signal pulse is applied to the upper input of the NOR gate 27, through the differentiating circuit including the capacitor 26. The output from the NOR gate 27 therefore changes to 0, this signal being applied to the AND gate 23 and being applied also to the lowermost input of the AND gate 24. Since the capacitor 28 cannot change its state of charge instantaneously, the 0 signal output from the NOR gate 27 is applied through the capacitor 28 to the input of the NEGATER 29, the output of which therefore changes to 1. This 1 signal is applied to the lower input of the NOR gate 27, thus ensuring that the output from the NOR gate 27 remains a 0 signal even after the differentiating circuit including the capacitor 26, which circuit has a short time constant (e.g. 0.1 msec.), has allowed the 1 signal applied to the upper input of the NOR gate 27 to decay to 0. The 1 output from the NEGATER 29 is applied also to the lower input of the AND gate 31, which therefore applies a 1 signal to the input 35 of the analogue memory device 19.

Referring to FIG. 3, when a 0 signal is present at each of the inputs 22 and 35, the transistors 39 and 45 are nonconductive, and the diode 48 is reverse-biased. Charging of the capacitor 20 takes place, however, through the resistor 41 and the diode 43, substantially to the +10 v. potential of the supply line 42. If now a 1 signal appears at the input 22 (e.g. when load A is attained in the course of a test), this renders the transistor 39 conductive so that the potential drop across the resistor 41 increases. The diode 43 thus becomes reverse-biased to an extent which inhibits further charging of the capacitor 20 until the test has been completed.

With reference to FIGS. 2 and 3, the application of a 1 signal to the input 35 (when load B is reached) acts as a command causing transistor 45 to become conductive. As a result the capacitor 20 begins to discharge steadily through the diode 48 and transistor 45. As the voltage across the capacitor decreases, the output voltage applied across the load signal potentiometer 13 decreases similarly, and the output from the load signal potentiometer 13 as applied to the input 15 of the comparator 16 also decreases, until a point is reached at which the magnitude of the load signal (from the slider of potentiometer 13) is equal to the magnitude of the negative extension signal from the potentiometer 14. At this point the sum of the signals applied to the input 15 becomes zero (and tends to become negative) so that the output from the amplifier 16 changes to 0. This 0 signal, applied to the upper input of the AND gate 31, closes that AND gate so that the signal applied to the input 35 of the memory device changes back to 0. This renders the transistor 45 nonconductive again, so that discharge of the capacitor 20 ceases. The 0 output from the comparator 16 is applied also to the NEGATER 32 which therefore supplies a 1 signal to the uppermost input of the AND gate 24.

While this has been happening, a 0 signal has been applied from the NOR gate 27 to the upper input of the AND gate 23, maintaining that gate in a closed state even though the signal supplied to its lower input has changed to 1.

The result of the foregoing adjustment of the load signal potentiometer 13 is that the outputs from the load and extension signal potentiometers 13 and 14 would remain equal, and would therefore continue to cancel one another out at the input 15, if the behavior of the specimen under test were to proceed thereafter in accordance with a continuation of a straight line characteristic drawn through the points 5 and 6 of the load/extension curve 2 (FIG. 1). The more usual behavior, however, is for the material of the specimen to begin to yield eventually so that the rate of increase in load, for a given rate of increase of extension, decreases and the slope of the curve 2 begins to decrease. Such an eventual change in the behavior of the specimen would cause the output from the extension signal potentiometer 14 to increase in magnitude above that from the load signal potentiometer 13, so producing a net negative voltage at the input 15.

However, the capacitor 28 has meanwhile been charging up, through the resistor 30, so as to restore a 1 signal at the input to the NEGATER 29. The time constant of this charging circuit is about 1.0 millisecond. After the delay associated with this time constant, the input to the NEGATER 29 reaches 1 again, so that the output therefrom changes to 0. This 0 signal is applied to the lower input of the AND gate 31, and is applied also to the lower input of the NOR gate 37 so that the output from the NOR gate 27 changes to 1. This 1 signal is applied to the upper input of the AND gate 23, causing it to supply a 1 input to the NEGATER 36. The resulting 0 output from the NEGATER 36 causes the switching device 37 to allow the preset proof stress percentage voltage to be applied from the potentiometer 17 to the input 15 and so effectively added to the signal from the load signal potentiometer 13. This additional signal received at the input 15 gives a net positive value to that input, with the result that the comparator 16 continues to produce a 1 signal output which is applied to the NEGATER 32. The consequent 0 output from the NEGATER 32 maintains closure of the AND gate 24 thereafter, despite the fact that the lowermost input of the AND gate 24 now receives a 1 signal from the NOR gate 27.

As yielding of the specimen under test progresses, the negative output from the extension signal potentiometer 14 increases faster than the positive sum of the outputs from the potentiometers 13 and 17, and eventually a point is reached at which the magnitude of the negative extension signal becomes equal to the magnitude of the said positive sum. This point corresponds to the point 4 on the curve 2 of FIG. 1, and at this point the output from the comparator 16 changes to 0. This 0 output is applied to the NEGATER 32, producing a 1 signal therefrom which causes the AND gate 24 to open and apply a 1 signal to the differentiating circuit that includes the capacitor 34. In consequence, a pulse is applied to the pen recorder and is recorded as a pulse indication at the point 4 (FIG. 1) of the characteristic curve being drawn by the pen recorder. Alternatively, as mentioned above, the output from the AND gate 24 could be made to switch on brakes so as to stop the test at the proof stress point, for example for the purpose of obtaining a digital readout of the proof stress itself.

Thus the adjustment of the voltage applied across the load signal potentiometer 13, as initiated by a 1 signal applied to the input 35 of the analogue memory device, causes the slope of a straight line joining the points 5 and 6, (FIG. 1), corresponding respectively to preselected loads A and B, to be "set-in" to the indicator. The components 27 to 30 comprise a timer which acts to initiate the setting-in of the aforesaid slope and provides a short delay, to enable such setting-in to take place (through equalization of the load and extension signals), before causing the proof stress percentage voltage to be added to the input 15 of the comparator 16. The reduction of the positive voltage across the load signal potentiometer 13 to the point at which the output from amplifier 16 changes from 1 to 0 takes say 200 microseconds, while the timer takes approximately 1.0 millisecond to time out. The changes in stress and strain at the specimen are generally negligible over such short periods, so the testing does not have to be halted to allow these voltage adjustments to be effected.

It will be appreciated that the slope which is automatically set-in to the indicator when the load B is reached is to some extent arbitrary. Thus, the slope depends only upon the characteristics of the specimen material at the two chosen loads A and B, and it is not essential to the attainment of a definite proof stress result from the indicator that the characteristic curve 2 of the specimen material should be rectilinear as the load increases from A to B.

It should now be appreciated also that the automatic operation of the indicator, at least up to the proof stress point, does not require any intermediate halting of the tensile testing of a specimen, and the voltage-matching circuitry for equalizing the output voltages from the load and extension signal potentiometers 13 and 14 at the load value B is particularly important in this respect and is believed to be novel in itself.

In a modified form of the illustrated voltage matching circuitry the resetting signal is applied to input 35 (FIG. 3) to discharge the capacitor 20 to zero voltage, and the adjusting command signal is applied to input 22 so that equalization is brought about by increasing the voltage across the capacitor 20, and therefore that across the potentiometer 13, from zero.

A somewhat simplified form of the illustrated proof stress indicator has the amplifiers 8 and 9 replaced by simple pushbutton devices which can be operated manually, to produce the required 1 signals, in dependence upon an operator's assessment of the development of the stress/strain characteristic actually being produced by a pen recorder of a testing machine. This would be subject to operator error in observing the desired load values A and B, but still would not involve any interruption of the testing.

With reference to FIG. 3, the electronic switching means constituted by the components 39 and 43, and by the components 45 and 48, might be replaceable by reed switches, for example, but this would probably increase the time needed for the voltage equalization, and proof stress setting-in, at the point 6 of FIG. 1.

I claim:

1. A proof stress indicator for use with a stress/strain testing apparatus in which there is produced during the testing of a specimen two electrical signals which are respective analogues of the increases in the stress and strain of the specimen above the particular values thereof obtained at a selected earlier stage of the testing, said proof stress indicator comprising:
   A. a voltage-matching device operable in dependence upon an input voltage for supplying an output voltage equal in magnitude to said input voltage and including:
      1. an analogue memory device having:
         a. a supply line;
         b. first and second control inputs;
         c. a capacitor for storing an analogue voltage;
         d. charging means connected between said capacitor and said supply line for charging said capacitor from said supply line and including a first switching means connected with said first control input and responsive for charging said capacitor only when a first control signal is being applied to said first control input;
         e. discharging means connected across said capacitor for discharging said capacitor and including a second switching means connected to said second control input and responsive for discharging said capacitor only when a second control signal is being applied to said second control input; and
         f. a readout circuit of high input impedance having input connected to said capacitor and an output for providing a readout of analogue voltage stored in said capacitor;
      2. command means connected to said memory device for applying said second control signal to said second control input;
      3. a comparator circuit having an input connected to said memory device and an output connected to said command means, and being connected and operable for comparing with one another said input voltage and a voltage taken as a percentage of the output of said analogue device and stopping application of said second control signal to said second control input when said compared voltages become substantially equal; and
      4. reset means connected with said first control input for applying said first control signal thereto and operable for causing said first control signal to be applied before said comparison is commenced to insure that said voltage taken as a percentage is greater than said input 1 voltage when said comparison is commenced; and
   B. proof stress insertion means for causing a third electrical signal to be fed to said comparator circuit of said voltage device and including an electronic timer connected to cause said third signal to be fed to said comparator circuit after said two electrical signals have become substantially equal; one of said two electrical signals being the input voltage of said voltage matching device, the other of said two electrical signals being said voltage taken as a percentage, and said third electrical signal being an analogue of a preselected proof stress percentage; and said proof stress indicator being operable for providing a response when said strain electrical signal has increased above said stress electrical signal by an amount equal to said third electrical signal.

2. A proof stress indicator as claimed in claim 1, further comprising electronic comparison means arranged to compare a preselected voltage with a voltage supplied as an analogue of the load on the specimen during testing and to initiate the operation of the timer automatically when the latter of these two voltages becomes equal to the former.

3. A proof stress indicator as claimed in claim 1 further comprising electronic comparison means arranged to compare a preselected voltage with a voltage supplied as an analogue of the load on the specimen during testing and to initiate the production of the said two electrical signals when the latter of these two voltages becomes equal to the former.

4. A proof stress indicator as claimed in claim 3, wherein the electronic comparison means of claim 3 acts also as the reset means of the voltage matching device by applying such first control signal, to ensure the desired condition of the voltage taken from the output of the analogue memory device at the commencement of the comparison, until the moment of initiation of the production of the said two electrical signals.

5. A proof stress indicator for use with a stress/strain-testing apparatus in which there is produced during the testing of a specimen two electrical signals which are respective analogues on the increases in the stress and strain of the specimen above the particular values thereof obtained at a selected earlier stage of the testing, said proof stress indicator comprising:
   A. a voltage matching device operable in dependence upon an input voltage for supplying an output voltage equal in magnitude to said input voltage and including:
      1. an analogue memory device having: 1.
         a. a supply line;
         b. first and second control inputs;
         c. a capacitor for storing an analogue; voltage;
         d. charging means connected between said capacitor and said supple line for charging a said capacitor from said supply line and including a first switching means connected with said first control input and responsive for charging said capacitor only when a first control signal is being applied to said d first control input;
         e. discharging means connected across said capacitor for discharging said capacitor and including a second switching means connected to said second control input and responsive for discharging said capacitor only when a second control signal is being applied to said second control input; and
         f. a read-out circuit of high input impedance having an input connected to said capacitor and an output for providing a read-out of analogue voltage stored in said capacitor;
      2. command means connected to said memory device for applying said first control signal to said first control input;
      3. a comparator circuit having an input connected to said memory device an an output connected to sad said command means, and being connected and operable for comparing said input voltage and a voltage taken as, a percentage of the output to said analogue memory device and stopping p application of said first control signal to said first control input when said compared voltages become substantially equal and
      4. reset means connected with said second control input for applying said second control signal thereto before said comparison is commenced to insure that said voltage taken an as a percentage is less than said input 1 voltage when said comparison is commenced; and,
   B. proof stress insertion means for causing a third electrical signal to be fed to said comparator circuit of said voltage device and including an electronic timer connected to cause said third signal to be fed to said comparator circuit after said two electrical signals have become substantially equal;
   one of said two electrical signals being the input voltage of said voltage matching device, the other of said two electrical signals being said voltage taken as a percentage, and said third electrical signal being an analogue of a preselected proof stress percentage; and said proof stress indicator being operable for providing a response when said strain electrical signal has increased above said stress electrical signal by an amount equal to said third electrical signal.

6. A proof stress indicator as claimed in claim 5 further comprising electronic comparison means arranged to compare a preselected voltage with a voltage supplied as an analogue of the load on the specimen during testing and to initiate the operation of the timer automatically when the latter of these two voltages becomes equal to the former.

7. A proof stress indicator as claimed in claim 5 further comprising electronic comparison means arranged to compare a preselected voltage with a voltage supplied as an analogue of the load on the specimen during testing and to initiate the production of the said two electrical signals when the latter of these two voltages becomes equal to the former.

8. A proof stress indicator as claimed in claim 7 wherein the electronic comparison means of claim 7 acts also as the reset means of the voltage matching device by applying such second control signal, to ensure the desired condition of the voltage taken from the output of the analogue memory device at the commencement of the comparison, until the moment of initiation of the production of the said two electrical signals.